Nov. 2, 1971      B. G. DAGGETT      3,616,711
METHOD AND MACHINERY FOR SHARPENING THE TEETH OF
CIRCULAR SAWS
Filed Oct. 7, 1969      4 Sheets-Sheet 1

INVENTOR.
BYRON G. DAGGETT
BY
*Warren H. Schmieding*
ATTORNEY

INVENTOR.
BYRON G. DAGGETT
BY
ATTORNEY

Nov. 2, 1971  B. G. DAGGETT  3,616,711
METHOD AND MACHINERY FOR SHARPENING THE TEETH OF
CIRCULAR SAWS
Filed Oct. 7, 1969  4 Sheets-Sheet 3
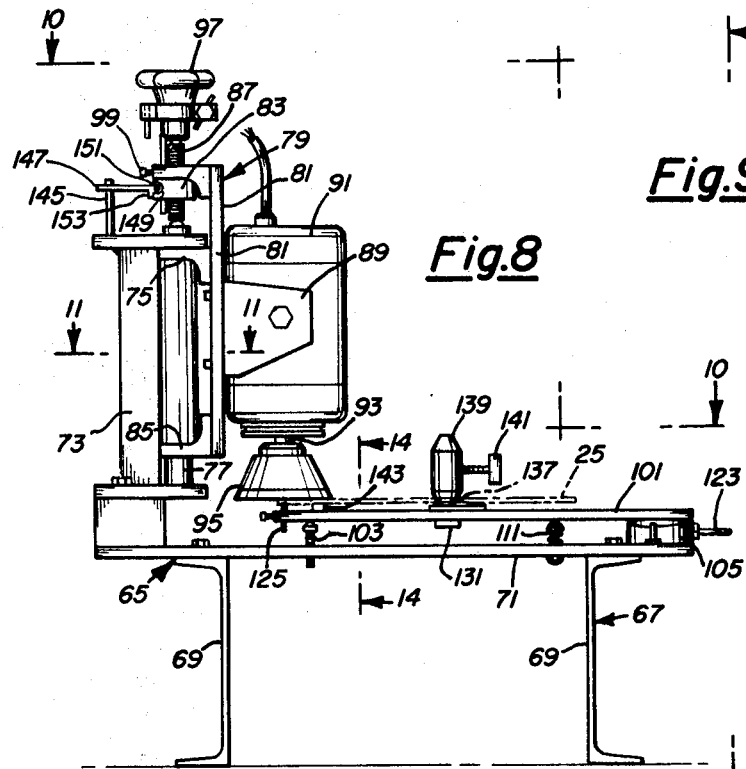
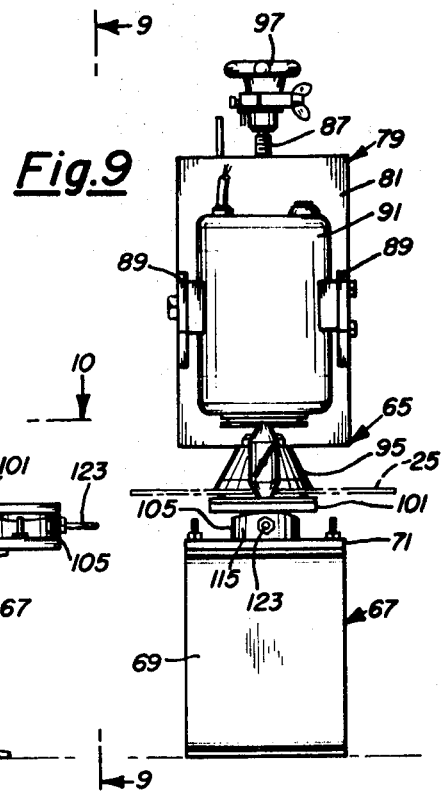
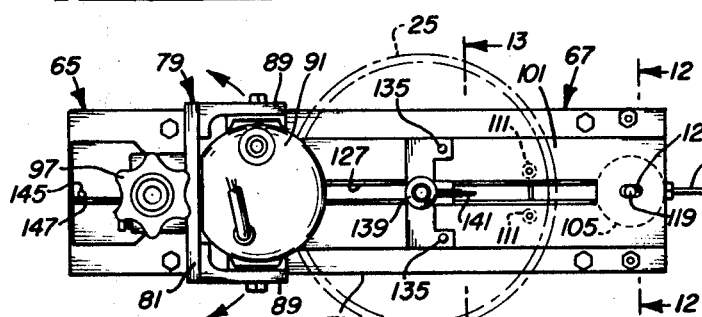
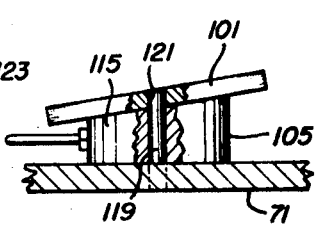
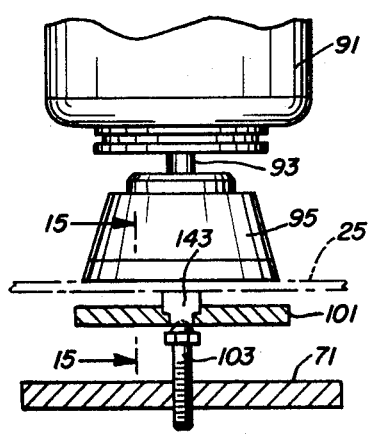
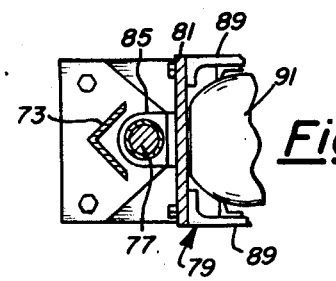
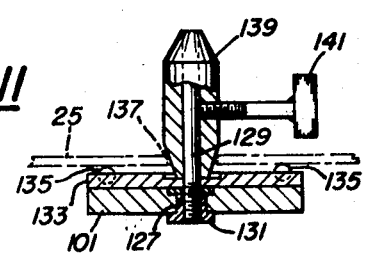
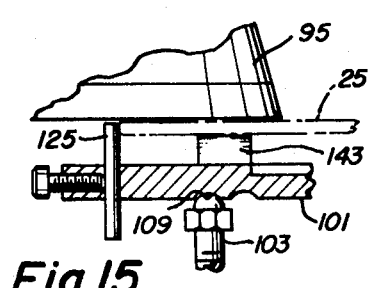
INVENTOR.
BYRON G. DAGGETT
BY
Warren H. Schmieding
ATTORNEY

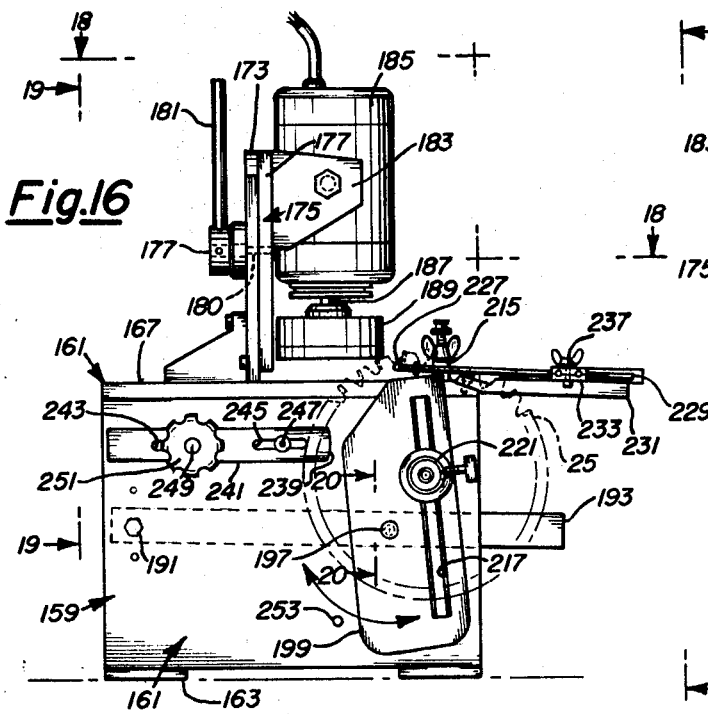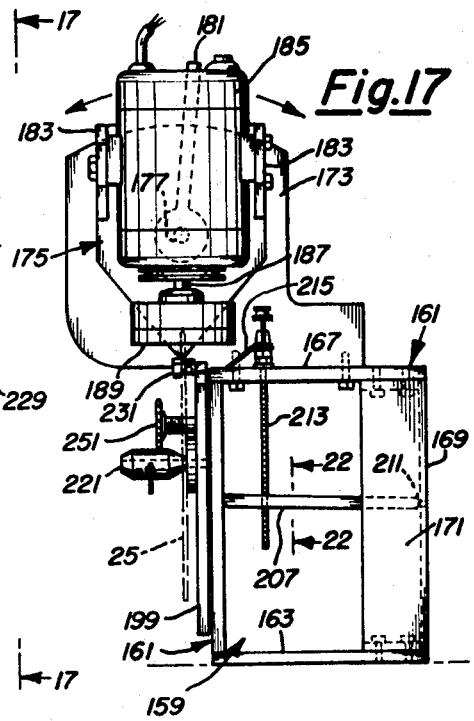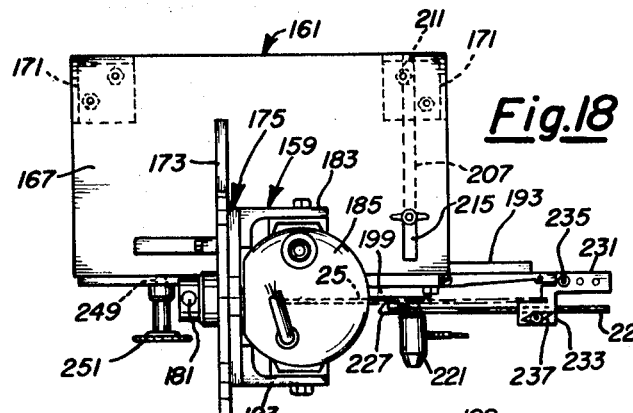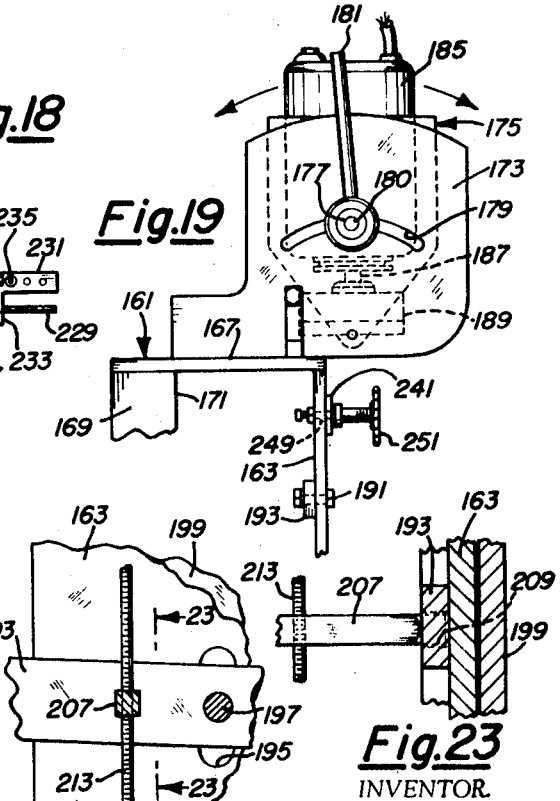

United States Patent Office 3,616,711
Patented Nov. 2, 1971

3,616,711
METHOD AND MACHINERY FOR SHARPENING THE TEETH OF CIRCULAR SAWS
Bryon G. Daggett, San Diego, Calif., assignor to Noryb Manufacturing, Inc., San Diego, Calif.
Filed Oct. 7, 1969, Ser. No. 864,408
Int. Cl. B31b 1/00
U.S. Cl. 76—37
11 Claims

ABSTRACT OF THE DISCLOSURE

Method and machinery for sharpening teeth of circular saws of the type in which teeth each have a portion which extends further outwardly from the plane of one side of the saw than the next adjacent tooth, and the next adjacent teeth each has a portion which extends outwardly further from the plane of the opposite side of the saw than the said alternate teeth. One machine is utilized for grinding the cutting faces of the teeth of the saw. Another machine is utilized for grinding the side faces of the teeth. And a third machine is utilized for grinding the peripheral surface of the teeth.

BACKGROUND OF THE INVENTION (1) Field of the invention

The invention is directed to the method of and the machinery for grinding the cutting faces, the side faces and the peripheries of saw teeth.

(2) Description of the prior art

The prior art known to applicant discloses machinery that is highly complicated, costly to manufacture and difficult to manipulate.

SUMMARY OF THE INVENTION

The machine for grinding the cutting faces of the teeth of the saw employs a rotatable grinding wheel having a grinding surface which lies parallel of the surface to be achieved on the cutting face of the tooth being ground. A guide is provided for maintaining the translatable movement between the grinding wheel and the saw, parallel with the plane of the surface to be achieved on the cutting face of the tooth being ground.

The machine for grinding the side faces of the teeth employs a tiltable support for the saw so that, while the support is tilted to one position, the axis of the overlying, rotating, grinding surface of the grinding wheel lies at right angles to the surface of that side face which is to be ground when oscillatory movement is imparted to the grinding, and so that while the support is tilted to another position, the axis of the grinding surface lies at right angles to the opposite surface of the tooth being ground.

The machine for grinding the peripheral surfaces of the teeth employs an oscillatable carriage for the saw, the carriage having an axis lying parallel with, but offset from the axis of the saw. The motor for rotating the grinding wheel is pivotally supported in a plane which is at right angles relative to the planes of the axes of the saw and carriage. The motor is locked in positions in which the axis thereof lies in selected planes which are different from the plane of the side of the saw.

Other features and the advantages of the present invention will be apparent from the following description, reference being had to the accompanying drawings wherein preferred embodiments of the invention are illustrated.

BRIEF DESCRIPTION OF THE DRAWINGS

FIG. 8 is a side view of the machine for grinding the sides of the carbide teeth of the saw;

FIG. 9 is a view looking in the direction of arrows 9 of FIG. 8;

FIG. 10 is a top plan view looking in the direction of arrows 10 of FIG. 8;

FIG. 11 is a fragmentary sectional view taken along line 11—11 of FIG. 8, but on a larger scale;

FIG. 12 is a view looking in the direction of arrow 12 of FIG. 10, but turned 90° clockwise and on a larger scale;

FIG. 13 is a sectional view taken along line 13—13 of FIG. 10, but on a larger scale;

FIG. 14 is a fragmentary view partly in section, the section being taken along line 14—14 of FIG. 8, but on a larger scale;

FIG. 15 is a fragmentary sectional view taken along line 15—15 of FIG. 14;

FIG. 16 is a front view of the machine for grinding the peripheries of the teeth;

FIG. 17 is a side view looking in the direction of arrows 17 of FIG. 16;

FIG. 18 is a top plan view looking in the direction of arrows 18 of FIG. 16;

FIG. 19 is a side view looking in the direction of arrows 19 of FIG. 16;

FIG. 20 is a fragmentary sectional view taken along lines 20—20 of FIG. 16, but on a larger scale;

FIG. 21 is a fragmentary view, partly in section, the section being taken along line 21—21 of FIG. 20;

FIG. 22 is a fragmentary view taken along line 22—22 of FIG. 17, but on a larger scale; and FIG. 23 is a fragmentary view taken along line 23—23 of FIG. 22.

DESCRIPTION OF THE PREFERRED EMBODIMENTS

Figure 1:
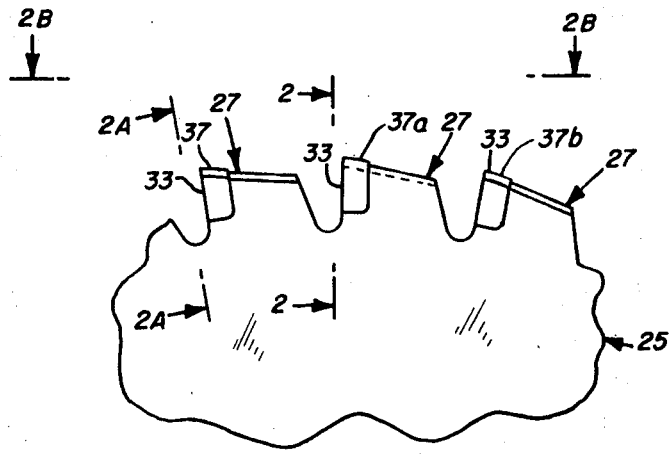
FIG. 1 is a fragmentary side view of a circular saw having carbide teeth.
Figure 2:
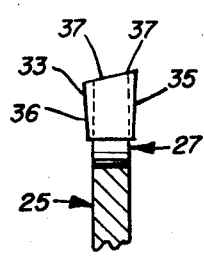
FIGS. 2 and 2A are sectional views taken along lines 2—2 and 2A—2A of FIG. 1.
Figure 2A:
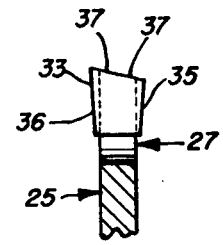
Figure 2B:
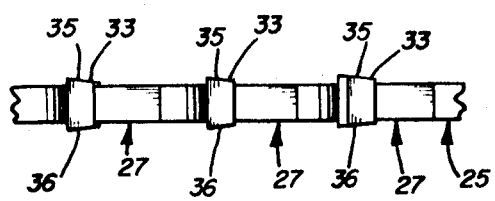
FIG. 2B is a view looking in the direction of arrows 2B of FIG. 1.
Figure 3:
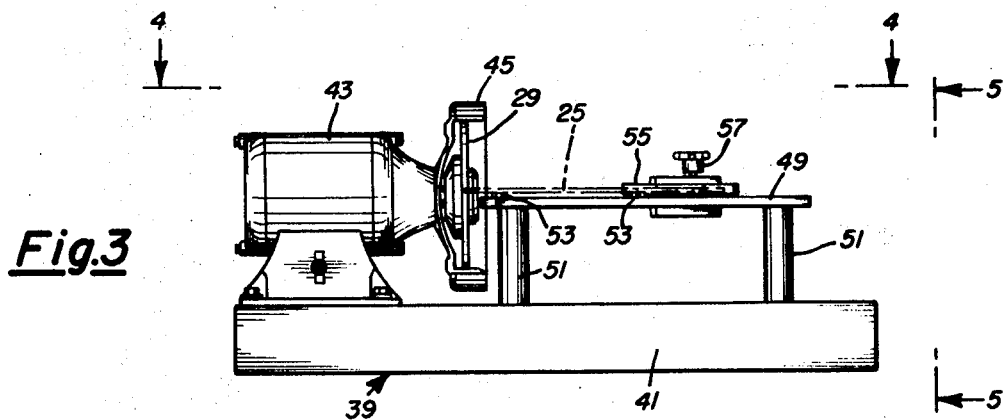
FIG. 3 is a side view of the machine for grinding the cutting faces of the teeth of the saw.
Figure 4:
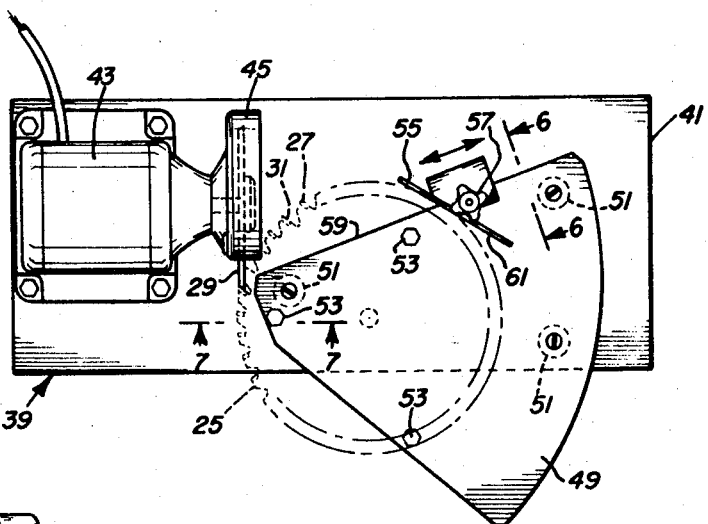
FIG. 4 is a top plan view looking in the direction of arrows 4 (see FIG. 3)
Figure 6:
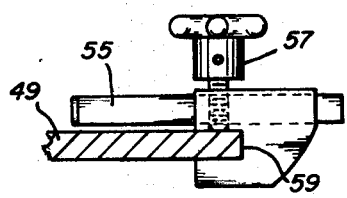
FIG. 6 is a fragmentary sectional view looking in the direction of arrows 6 of FIG. 4, but on a larger scale.
Figure 5:
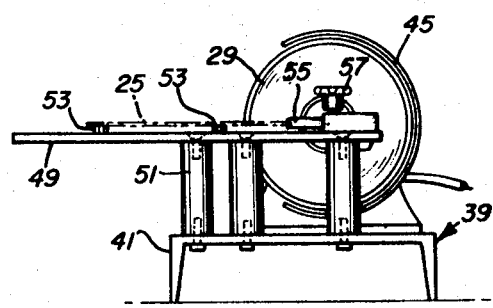
FIG. 5 is an end view looking in the direction of arrows 5 (see FIG. 3)
Figure 2C:
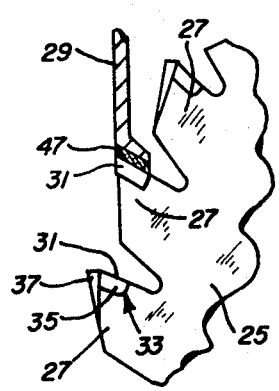
FIG. 2C is a view similar to FIG. 1, but showing a fragment of the grinding wheel in position for grinding a cutting face of a tooth.
Figure 7:
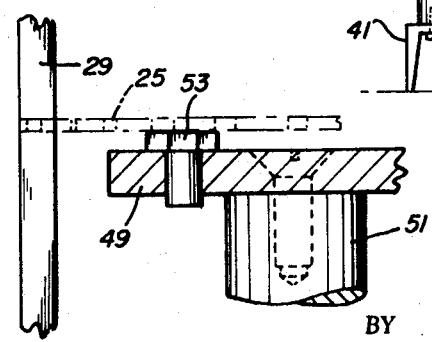
FIG. 7 is a fragmentary sectional view taken along line 7—7 of FIG. 4, but on a larger scale.

The fragmentary view of the saw 25, FIGS. 1, 2B and 2C show three teeth 27 of the saw and a fragmentary view in section of the grinding wheel 29 for grinding the cutting faces 31 of the teeth. The teeth are provided with carbide 33, having opposite side faces 35 and 36 and peripheries 37. FIGS. 1, 2, 2A, 2B and 2C are enlarged and the angles of the side faces 35 and 36 and the angles of the peripheral surfaces 37 of the teeth have been exaggerated. It will be observed from FIG. 2B that the side faces 35 and 36 of the teeth angle slightly forwardly and outwardly toward the left as viewed in FIG. 2B. It is to be observed in FIGS. 2, and 2A that the side faces slope radially inwardly and rearwardly from the periphery of the teeth.

As shown in FIGS. 1, 2 and 2A the peripheral surfaces 37 of alternate teeth slope sidewise in one direction as shown in 37a, and the peripheral surface of the intermediate teeth slope sidewise in the opposite direction as shown at 37b.

Machine for grinding cutting faces of the saw teeth

Referring now to the machine 39 for grinding the cutting faces 31 of the saw teeth 27, the machine includes a frame 41 which supports an electric motor 43 which rotates the grinding wheel. A guard 45 partly encompasses the wheel. As shown more clearly in FIG. 2C, the grinding wheel is dish-shaped and the periphery 47 thereof complements the angle of the cutting faces 31 of the teeth.

A plate 49 is supported by a plurality of posts 51. This plate lies in a horizontal plane and carries three buttons 53. These buttons support the saw 25 during the grinding operation.

A guide 55 is adjustably fixed by clamping mechanism 57 along one edge 59 of the plate 49 to accommodate saws of different diameter. The guiding face 61 of the guide extends vertically and is engaged by the periphery of the saw. One tooth at a time is ground by sliding the saw over the buttons 53 with the cutting face 31 of the tooth in engagement with the grinding wheel 29. The angle of the guiding face 61 of the guide 55 corresponds to the angle of the cutting face 31 of the tooth being ground.

Machine for grinding side faces of the saw teeth

Referring now to the machine 65 for grinding the side faces 35 and 36 of the teeth 27 of the saw 25, the machine includes a frame 67 having uprights 69 which carry a table top 71. As viewed in FIG. 8, the left side of the table carries a stand 73, the top of which carries an arcuately shaped bearing 75. An upright shaft 77 is carried by the stand 73, which shaft is axially aligned with the bearing 75. A C-shaped motor-supporting frame 79 includes a vertically extending leg 81, an upper leg 83 and a lower leg 85. A vertically extending screw 87 is threaded into the upper leg 83. The lower end of the screw is provided with a socket (not shown) by which the screw and frame 79 rest upon bearing 75. The lower leg 85 surrounds the shaft 77 for guiding the frame 79.

Brackets 89 are fixed to the vertical leg 81 of C-shaped frame 79 and those brackets carry an electric motor 91, the shaft 93 of which extends generally vertically and carries a grinding wheel 95. The angle of the wheel can be adjusted so as to conform to the angle at which grinding is to be effected. The motor 91 and C-shaped frame 79 may be swung about the bearing 75. The height of the motor and grinding wheel can be adjusted by turning the screw 87 through the knob 97 on the screw. The height can be maintained by setting the set screw 99.

An elongated horizontally extending support 101 is carried above the table top 71 by post 103 and a cam 105. The post is threaded in the table top. The top of the post is in the form of a semi-sphere. The underside of the support 101 is provided with a socket 109 which receives the semi-spherical end of the post. The socket is disposed midway between the sides of the support 101 and adjacent the left end of the support. The cam 105 is fixed adjacent the right end of the support 101 and midway between the sides of the support. Two springs 111 are hooked to the underside of the support and to the table top. These springs are disposed between the post 103 and the cam 105. They are under tension for yieldingly maintaining the support 101 in position on the post and cam.

The cam 105 includes a sloping upper side 115. A vertically extending pin 119 is fixed to the support 101 midway between the sides thereof and forms the pivot for the cam. This pin extends through a slot 121 in the support 101. A handle 123 is fixed to the cam for manipulating the same. When the cam is turned ninety degrees clockwise from the position shown in FIGS. 8, 9 and 10, the support 101 will be tilted to the position shown in FIG. 12 or when the cam is turned ninety degrees counter-clockwise from the position shown in FIGS. 8, 9 and 10, the support will be tilted in the opposite direction from that shown in FIG. 12. Thus the support 101 for saw 25 can be tilted to the right or left, as viewed in FIG. 9, by manipulating the cam 105.

As shown more clearly in FIG. 15, the saw support 101 carries an upwardly extending pin 125 to the left of the post 103. As seen in FIG. 13, support 101 is provided with a longitudinally extending slot 127 which receives a pin 129. This pin is threaded at the lower end and is received by a T-nut 131. The pin extends through a slide 133 having two upwardly extending buttons 135. The central opening 137 of the saw 25 receives a tapered retainer 139 which is fixed to the pin 129 by a set screw 141. The saw 25 is fixed in adjusted position by placing the same on buttons 135 and a third button 143. It is then shifted to the left as viewed in FIGS. 8, 10 and 15, until the extreme periphery thereof abuts the pin 125. The retainer 139 is then turned to hold the saw in position. However, the saw can be rotated manually.

The angle of the top side 115 of the cam is determined by the angle to be achieved on the side faces 35 and 36 of the teeth. After the saw is in the desired position, for example as shown in FIG. 12, the position of the motor 91 is adjusted so that the face of the tooth beneath the grinding wheel will be ground to the angle desired. All alternate faces, for example all faces 35a, are ground sequentially. Thereafter, the saw is turned over and then all faces 36a are ground sequentially. Thereafter, the saw support 101 is tilted in the opposite direction by turning the cam one hundred eight degrees counterclockwise. The motor and grinding wheel are then readjusted for grinding the surfaces 36b. The surfaces 36b are then ground sequentially. After those surfaces are ground, the saw is reversed and the alternate surfaces 35b are ground sequentially.

In view of the fact that many saws have teeth which are close to one another, it is essential that the grinding wheel be prevented from striking the tooth which is next adjacent the tooth being ground. Therefore, the extent of movement of the grinding wheel must be limited. A vertical stop 145 is carried by the top of stand 73.

A lever 147 includes a C-shaped yoke 149 which is pivoted to the upper leg of the C-shaped frame 79 by pins 151. A leg 153 on lever 147 limits the downward movement of the lever 147. The lever, as shown, limits the extent of clockwise movement of the motor and grinding wheel when the saw support 101 is in one of its two tilted positions. To limit the extent of counterclockwise movement of the grinding wheel, i.e. when the saw support is in its other position, the lever is moved to behind the stop 145. Such movement turns the motor and grinding wheel.

Machine for grinding peripheral surfaces of saw teeth

The machine 159, shown in FIGS. 16 to 23, for grinding the peripheral surfaces 37 of the saw teeth, includes a frame 161. The frame includes a base 163, a front wall 165, a rear wall 167, a top wall 169 and a brace 171. The top wall 169 carries a vertically extending frame 173. A motor support plate 175 is pivoted at the lower portion thereof to the frame 173 by a pivot 177. The frame is arcuately slotted at 179, the axis of the slot being the same as the axis of the pivot 177. A bolt 180 extends through the slot 179 and is threaded into the frame 173. The bolt is turned by a handle 181. The positions of the plate 175 with respect to the frame can be changed by loosening the bolt 180 and shifting the same. The plate is locked in position by tightening the bolt. Motor support plate 175 carries brackets 183 which support an electric motor 185. This motor rotates a vertically extending shaft 187 which carries a grinding wheel 189. From the foregoing it is apparent that the motor and grinding wheel can be shifted to change the angle of the grinding surface of the grinding wheel.

The front wall 165 of the frame 161 carries a pivot pin 191 near the left side thereof. A horizontally extending, elongated lever 193 is pivotally carried on the rear side of front wall 165 by the pin 191. The lever extends beyond the right side of the front wall to provide a handle for manipulating the same. The front wall 165 is provided with a generally vertically extending slot 195 for receiving a horizontally extending pin 197. The pin 197 is carried by the lever 193. A carriage 199 is carried by the front end of the pin 197 and is movable vertically by the pin through vertical movement of the lever 193. The rear of the pin 197 carries an abutment 201 (shown at the left end of the pin in FIG. 20). A coil spring 203 is interposed between that abutment and the lever 193 for frictionally maintaining the position of the lever and carriage 199. A washer 205 is interposed between the front wall 165 and the carriage to minimize friction between the carriage and front wall.

A horizontally extending rod 207 is supported in a socket 209 in the rear of the lever 193 and in a socket 211 in the front of rear wall 169 of the frame. Rod 207 is threaded transversely thereof, as shown in FIG. 22 for receiving a vertically extending screw 213. The vertical position of the carriage 199 is controlled by manipulating the screw 213 since the carriage is carried by the lever 193. An indicating finger 215 is fixed to the upper end of the screw which, in cooperation with a dial (not shown) on top wall 167 of the frame 161, indicates the position of the carriage 199.

The carriage 199 is slotted longitudinally thereof as at 217, which slot receives a T-nut like that shown at 131 in FIG. 13. A suitable retainer 221 extends through the central opening of the saw 25. The retainer 221 forms an axle for rotatably supporting the saw. Preferably the retainer 221 is manipulated to fix the saw to the carriage 199 during the grinding of each tooth.

A tooth selector in the form of a hook 227 is pivotally supported on an extension 231 of the carriage 199. As seen more clearly in FIG. 16, the hook is carried on an arm 233 which is pivoted by a pin 235 for swing movement in a horizontal plane whereby it can be moved out of the path of movement of the teeth of the saw. The hook can be adjusted to vary its distance toward and away from the carriage and set in adjusted position by a set screw 237. This adjustment is necessary since the distance between the teeth of one type of saw differs from the distance between the teeth of other types of saws.

As previously explained, the peripheral surfaces of carbide teeth angle rearwardly and in many types of saws the peripheral surfaces of alternate teeth slant sidewise in one direction and the intermediate teeth slant sidewise in the opposite direction. By tilting the motor and grinding wheel to the right or left, as viewed in FIG. 17, the grinding surface of the grinding wheel effects the slant or slants which are to be achieved. When the saw is of the type in which the next adjacent teeth slant in opposite directions, the motor is set in a position, for example, to the right as viewed in FIG. 17, for grinding slanting surfaces on the periphery of the teeth. However only alternate teeth are subjected to the grinding surface. After all alternate teeth are ground, sequentially, then the motor is set to the left and all intermediate teeth are ground sequentially.

The grinding is effected by slowly moving the carriage 199 and the saw thereon counterclockwise, the saw being held in position on the carriage by the hook 227. Since the axis of the saw, as determined by the retainer 221, is eccentric with respect to the pivot pin 197 for the carriage 199, the grinding action effects rearward sloping of the periphery of the tooth. The counterclockwise movement of the saw is limited by a stop 239 which is adjustable horizontally to accommodate various diameter saws. The stop 239 is carried by a slidable member 241, it being provided with aligned slots 243 and 245. A headed bolt 247 extends through slot 245 and is threaded into the front wall 163. A bolt 249 extends through the slot 245 and is also threaded into the front wall 163. A bolt 249 extends through the slots 243 and is also threaded into the front wall. The bolt 249 is provided with a hand-actuated knob 251 for fastening the stop is adjusted position.

A stop 253, which is fixed to the front side of front wall 165, limits clockwise movement of the carriage 199 about the pivot pin 197.

Having described my invention, I claim:

1. The method of sharpening the teeth of a circular saw in which alternate teeth each have a portion which extends farther outwardly from the plane of one side of the saw than the next adjacent tooth, and the said next adjacent teeth each has a portion which extends outwardly farther from the plane of the opposite side of the saw than the said alternate teeth, which method comprises:

(A) grinding the cutting faces of the teeth sequentially by:
  (1) revolving a grinding wheel having a grinding surface disposed parallely to the cutting faces to be achieved on the teeth;
  (2) guiding translatable movement between the tooth being ground and the grinding surface of the grinding wheel in a plane parallel with the cutting face to be achieved on the tooth being ground;

(B) grinding both side faces of each of the teeth by:
  (1) grinding sequentially alternate teeth while the side of the saw is supported in a tilted position in which the cutting surface of the grinding wheel moves parallelly with the angle which is to be achieved on the teeth;
  (2) imparting oscillatory movement to the grinding wheel sequentially to the same alternate teeth,
  (3) grinding sequentially the teeth between said alternate teeth while the saw is supported in an opposite tilted position in which the cutting surface of the grinding wheel moves parallelly with the angle which is to be achieved on the second mentioned teeth,
  (4) imparting oscillatory movement to the grinding wheel sequentially to the second mentioned teeth,
  (5) moving the saw to the side obverse to the first mentioned side,
  (6) grinding sequentially alternate teeth while the side of the saw is supported in a tilted position in which the cutting surface of the grinding wheel moves parallelly with the angle which is to be achieved on the teeth,
  (7) imparting oscillatory movement to the grinding wheel sequentially to the said alternate teeth,
  (8) grinding sequentially the teeth between said alternate teeth while the saw is supported in an opposite tilted position in which the cutting surface of the grinding wheel moves parallelly with the angle which is to be achieved on the second mentioned teeth,
  (9) imparting oscillatory movement to the grinding wheel sequentially to the second mentioned teeth;

(C) grinding the peripheral surface of the teeth of the saw by:
  (1) grinding sequentially the peripheral surface of alternate teeth which extend outwardly farther from one side plane of the saw than the next adjacent teeth by supporting the saw on an oscillatable carriage and while subjected to a revolving grinding surface which overlies the periphery of the tooth being ground and in which the axis of the grinding wheel lies at right angles to the peripheral surface of the tooth being ground, (2) oscillating the carriage while the tooth to be ground is in grinding relationship with the overlying grinding surface, (3) changing the axis of the grinding wheel so that its axis lies at right angles to the periphery of the teeth next to the first mentioned teeth which extend outwardly from the opposite side plane of the saw, (4) sequentially subjecting each of the peripheral surfaces of the said next adjacent teeth to the grinding by the wheel by oscillating the carriage while the tooth being ground is in grinding relationship with the overlying grinding surface.

2. A machine for grinding the cutting faces of the teeth of a circular saw, said machine comprising in combination:

(A) a frame for supporting the saw;

(B) a wheel having a peripheral grinding surface carried by the frame;

(C) a guide having a guiding surface for the periphery of the saw, said guiding surface corresponding to the surface to be achieved on the cutting faces of the saw;

(D) means for fastening the guide in position on the base in which the guiding surface thereof lies parallel with the cutting face of the tooth of the saw being ground;

(E) means on the frame for rotatably supporting the wheel.

3. A machine as defined in claim 2, characterized in that the wheel is dish shaped.

4. A machine as defined in claim 2, characterized in that the base and the axis of the wheel extend horizontally.

5. A machine for grinding the side faces of teeth of a circular saw of the type in which alternate teeth each has a portion which extends farther outwardly from the plane of one side of the saw than the next adjacent tooth, and the said next adjacent teeth each has a portion which extends outwardly farther from the plane of the opposite side of the saw than the said alternate teeth, said machine comprising in combination;

(A) a main frame;

(B) a support for a circular saw carried by the frame;

(C) means for supporting the support on the frame for tiltable movement of the support;

(D) a grinding wheel having a grinding surface overlying a tooth of the saw when the saw is on the support;

(E) a rotatable motor for rotating the grinding wheel;

(F) means on the frame for supporting the motor and grinding wheel for oscillatory movement thereof about the axis thereof with the grinding surface moving in a plane which is parallel with the plane to be achieved on the side faces.

6. A machine as defined in claim 5, characterized in that the means (C) for supporting the saw includes:

(C)

(1) a pivot on the frame adjacent one end of the support, (2) a cam adjacent the opposite end of the support for tilting the support in opposite directions, (3) a spring means yieldingly urging the saw support against the pivot and the cam, (4) a pivot for rotatably supporting the cam, (5) and manual means for moving the cam about the latter pivot.

7. A machine as defined in claim 5, characterized in that the means (C) for supporting the saw includes:

(C)

(1) a guide extending toward the grinding wheel, (2) a slide guided by the guide and carrying the saw;

and further characterized in that the frame (A) includes:

(A)

a stop for limiting the movement of the saw toward the grinding wheel.

8. A machine as defined in claim 5, characterized to include:

(G) means for limiting the extent of oscillatory movement of the motor, including:

(1) an arm movable with the motor, (2) a pivot for the arm lying transversely of the axis of the motor, (3) a stop carried by the frame lying in the path of movement of the arm when oscillatory movement is imparted thereto, said arm being manually movable to either side of the stop.

9. A machine for grinding a peripheral surface of teeth of a circular saw, said machine comprising in combination:

(A) a frame for supporting the saw;

(B) a rotatable shaft;

(C) a grinding wheel on the shaft;

(D) a carriage including:

means for rotatably supporting a circular saw at the axis of the saw;

(C) means on the frame for pivotally supporting the carriage for oscillatory movement relative to the frame, the axis of the latter means being parallel with and offset with respect to the axis of the saw;

(F) a motor for rotating the grinding wheel;

(G) pivot means for supporting the motor on the frame, the axis of the pivot means being in a plane at approximately right angles relative to the planes of the aforementioned axes;

(H) means for locking the motor in planes in which the axis of the motor lies in selected planes which are different from the plane of the side of the saw.

10. A machine as defined in claim 9, characterized in that the means for supporting the carriage includes:

(C)

(1) a pivot on the frame, (2) a lever carried by the pivot, (3) a pivot on the lever for pivotally supporting the carriage.

11. A machine as defined in claim 9, characterized to include:

(I) a hook disposed for movement into and out of engagement with the portion of the saw opposite the cutting faces of the saw teeth;

(J) means for pivotally supporting the hook on the carriage.

References Cited

UNITED STATES PATENTS

| | | | |
|---|---|---|---|
| 2,249,743 | 7/1941 | Bucknam | 76—37 |
| 2,642,758 | 6/1953 | Styles | 76—48 |
| 2,720,798 | 10/1955 | Hedlund | 76—43 |
| 3,279,282 | 10/1966 | Gill | 76—40 |

BERNARD STICKNEY, Primary Examiner

U.S. Cl. X.R.

76—40, 42, 48, 74

UNITED STATES PATENT OFFICE
CERTIFICATE OF CORRECTION

Patent No. 3,616,711                  Dated November 2, 1971

Inventor(s) BYRON G. DAGGETT

It is certified that error appears in the above-identified patent and that said Letters Patent are hereby corrected as shown below:

Column 6, line 35, cancel "same" and substitute --said--;

Column 7, line 18, after "a" (second occurrence) insert --beveled--.

Signed and sealed this 2nd day of May 1972.

(SEAL)
Attest:

EDWARD M. FLETCHER, JR.             ROBERT GOTTSCHALK
Attesting Officer                      Commissioner of Patents